Sept. 10, 1929.   C. SCHUETZ   1,727,910
MEANS FOR AUTOMATIC CONTROL
Filed Sept. 5, 1924   5 Sheets-Sheet 3
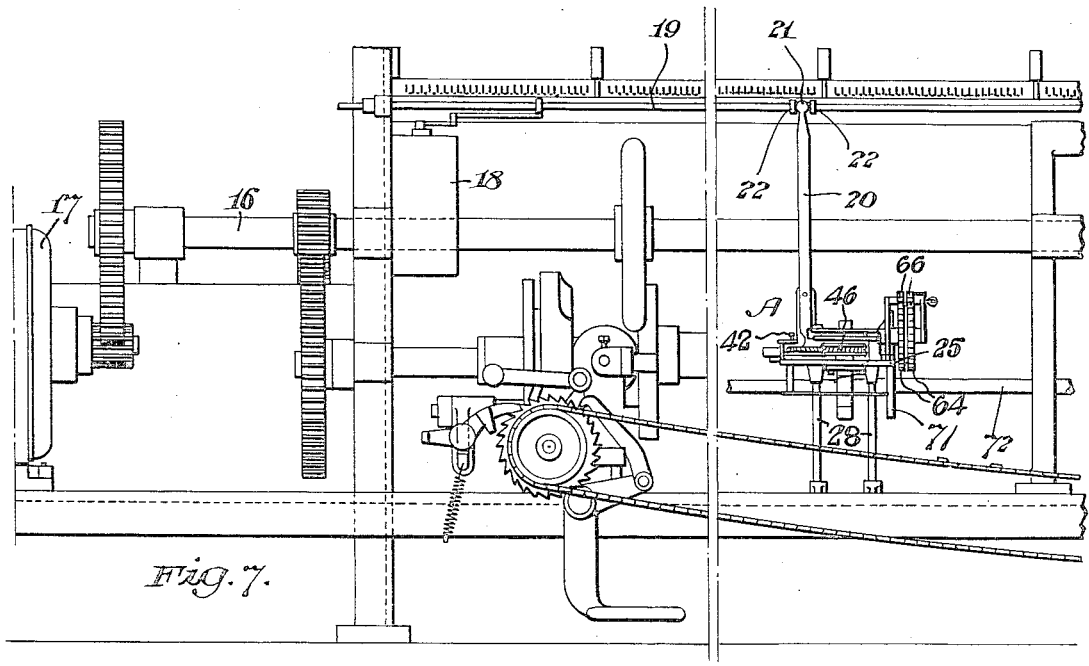
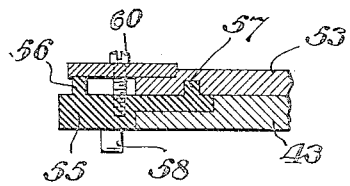
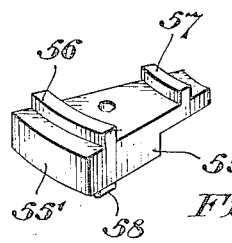
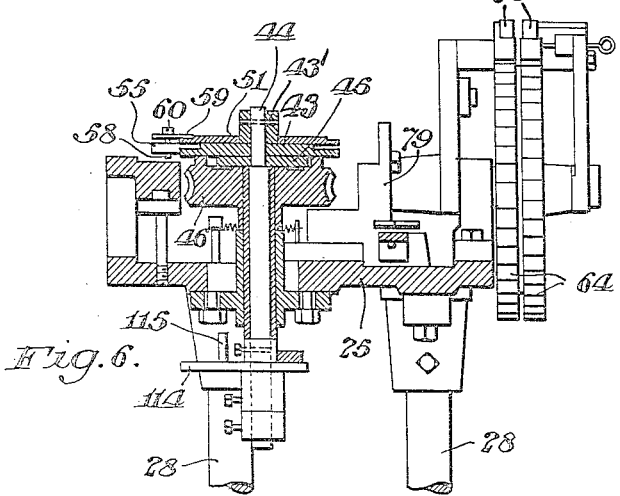

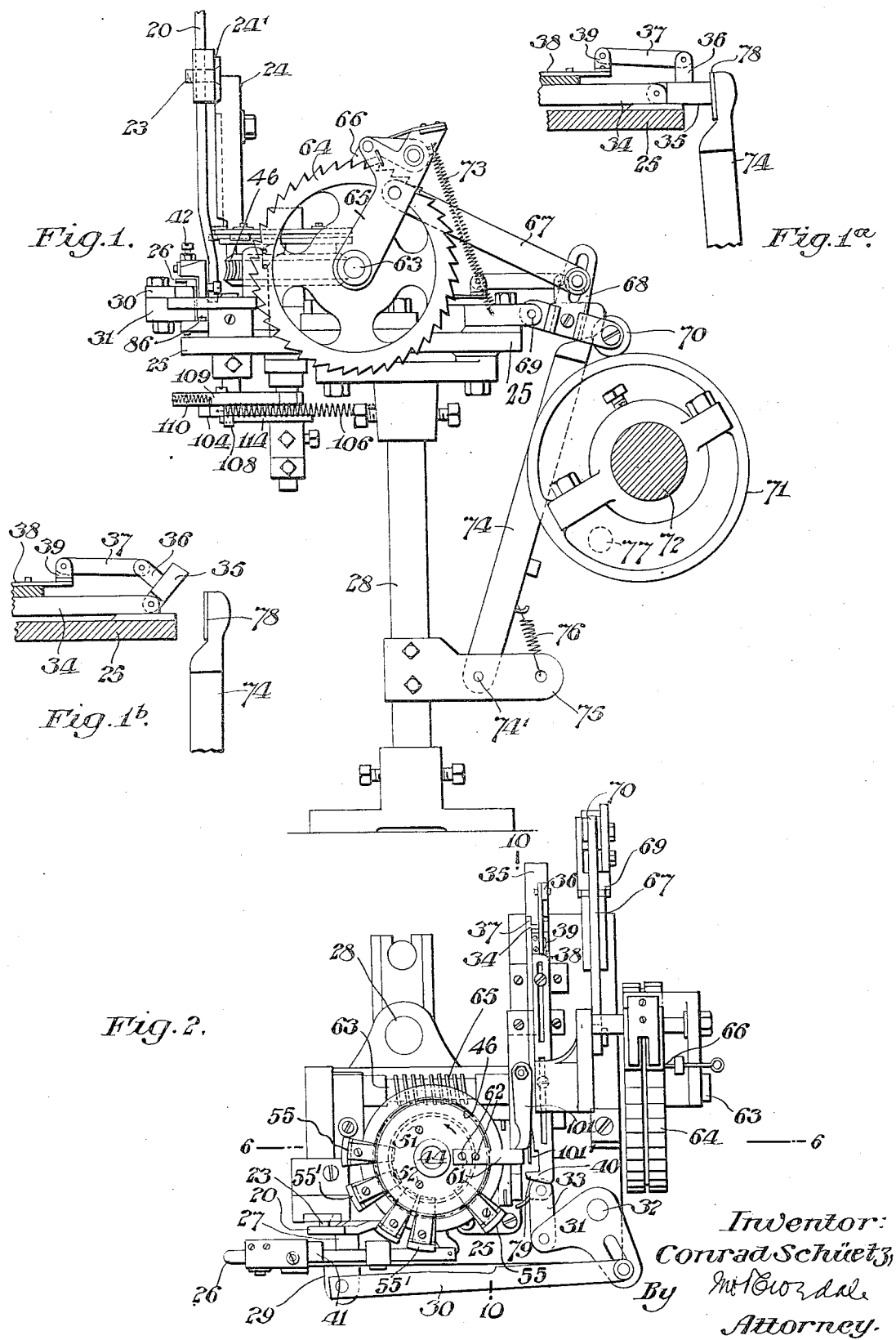

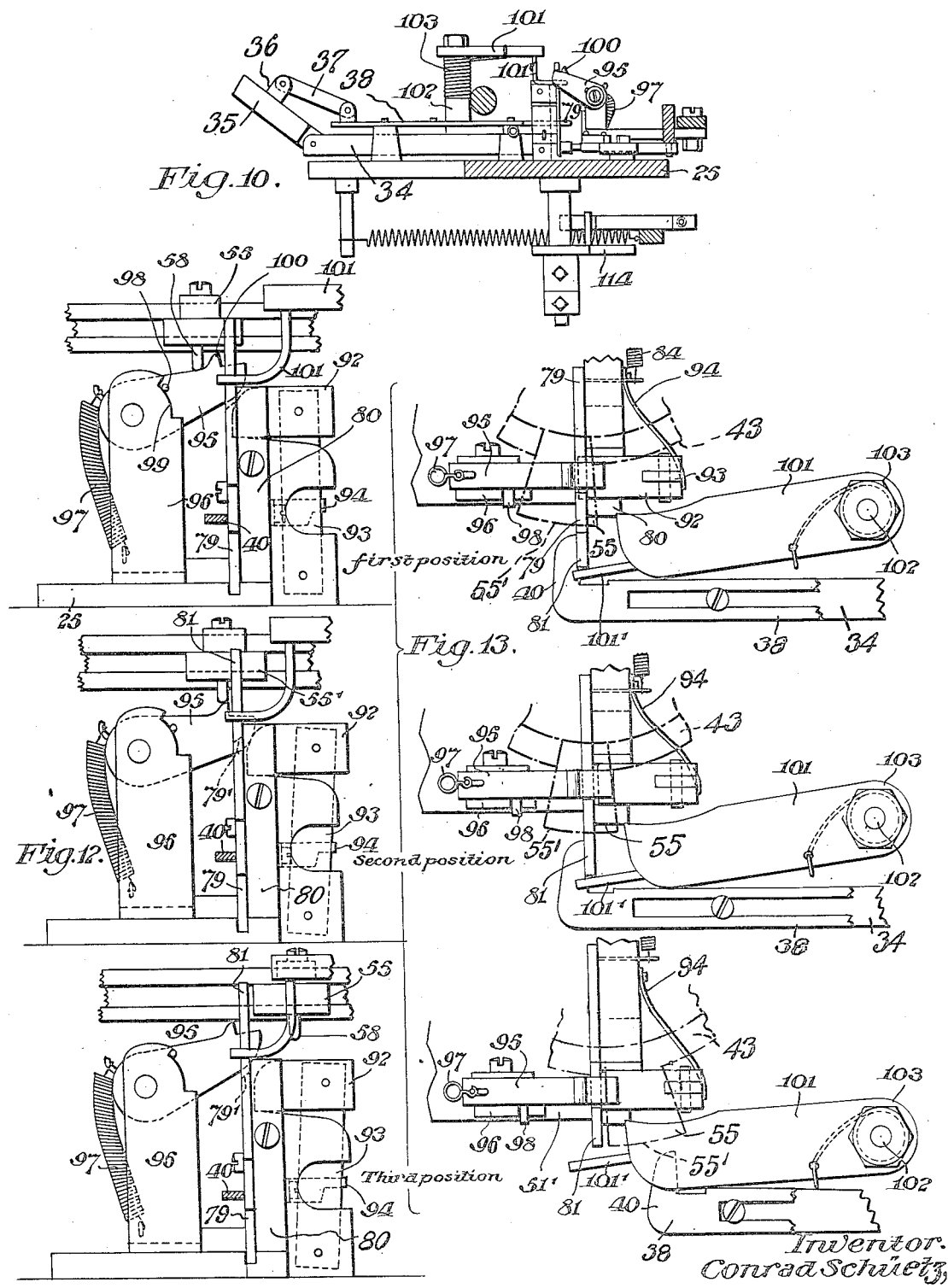

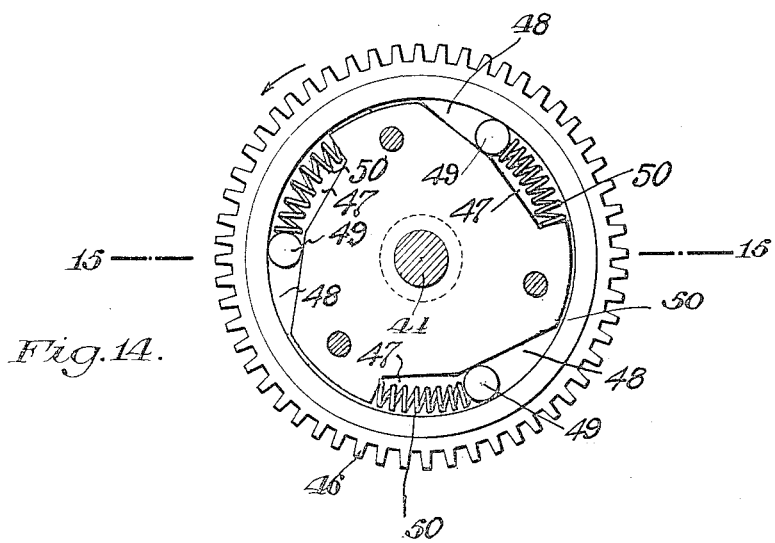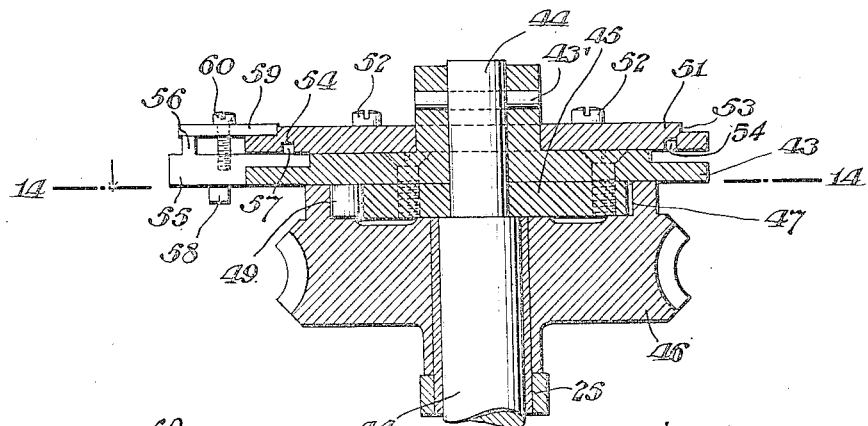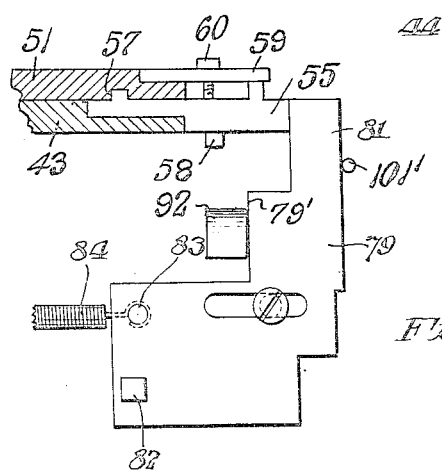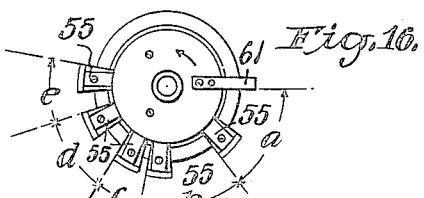

Patented Sept. 10, 1929.

1,727,910

UNITED STATES PATENT OFFICE.

CONRAD SCHUETZ, OF PHILADELPHIA, PENNSYLVANIA, ASSIGNOR, BY MESNE ASSIGNMENTS, TO ROSE LIBERMAN AND HERMAN P. LIBERMAN, BOTH OF PHILADELPHIA, PENNSYLVANIA.

MEANS FOR AUTOMATIC CONTROL.

Application filed September 5, 1924. Serial No. 736,096.

My invention relates to means for automatic control. The invention is especially applicable to length and narrowing regulator for full-fashioned hosiery knitting machines.

The object of the invention is to provide improved means for determining, for example, the number of courses of given characteristics before stopping the machines. The invention is especially adapted for the control of a multiple head machine, containing for example from eighteen to twenty sections, each of which produces a stocking. Each of these sections is practically a knitting machine in itself, but all work in synchronism and have in common the drive motion and the various supplemental attachments and mechanisms such as narrowing motion, tension, yarn feeding and so forth.

The invention comprises improved means for permitting a predetermined number of courses to be knitted, and then for automatically stopping the knitting machine, in order to permit the operator to set the knitting machine for another set of courses, having a different width, or other characteristics, whereupon the knitting machine is again arbitrarily started, and, after knitting another predetermined number of courses, the knitting machine is again automatically stopped and so on until the work is completed.

Upon the completion of the work, that is the last course, it is desirable that the controlling mechanism be automatically carried to initial position, to facilitate the beginning of a new piece of work, and the invention comprises method and means for accomplishing this object.

The invention also comprises improvements in details of construction.

This application comprises improvements in the means described in my Patent No. 1,680,808, granted Aug. 14, 1928.

Referring to the drawings, which illustrate merely by way of example, suitable means for effecting the invention:—

Fig. 1 is a side elevation.

Fig. 1ᵃ is a fragmentary elevation of parts that are obscured in Fig. 1.

Fig. 1ᵇ is a similar view with parts in different position.

Fig. 2 is a plan view.

Fig. 6 is a section on the line 6, 6 of Fig. 2.

Fig. 7 is an elevation of a portion of the knitting machine, showing the position of the controlling device, on a reduced scale.

Fig. 8 is a fragmentary section on an enlarged scale.

Fig. 9 is a view in perspective on an enlarged scale of block 55.

Fig. 10 is a section on line 10, 10 of Fig. 2.

Fig. 11 is an elevation of the detent plate.

Figure 3:
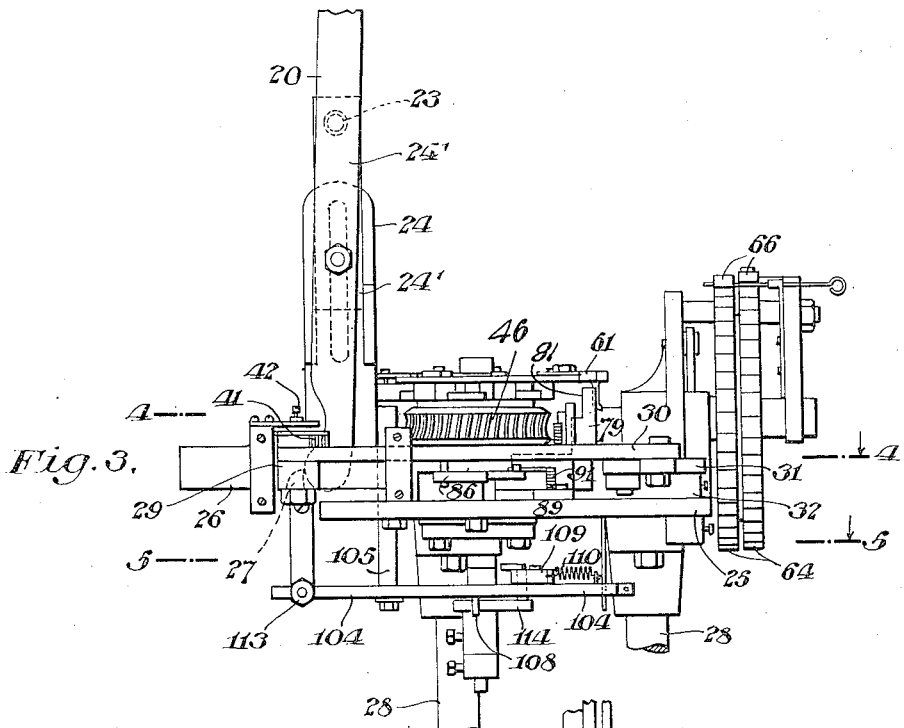
Fig. 3 is a front elevation.

Fig. 12 comprises views in elevation of the detent plate and controlling mechanism showing the same in three different positions.

Fig. 13 comprises plan views of same.

Fig. 14 is a plan view of worm gear wheel and associated mechanism, below line 14, 14 of Fig. 15.

Fig. 15 is a section on line 15, 15 of Fig. 14.

Fig. 16 is a diagrammatic representation of the respective movements of the head between points of release.

Figs. 11 to 15 inclusive, are on enlarged scale.

Similar numerals refer to similar parts throughout the several views.

In Fig. 7, is shown a portion of a knitting machine, the drive shaft 16 of which is operated by the motor 17. The motor switch or other suitable control 18, is operated by the horizontal rod 19, which extends across the machine and is adapted to be shifted to the right or to the left by the operator to stop or start the motor. The mechanism comprising the present invention, indicated by A, is attached at a suitable point on the machine, and is provided with the lever 20 having its free end 21 projecting between studs or abutments 22 on rod 19.

The lever 20 is pivoted at 23, see Fig. 3, to the element 24' of standard 24 connected to the frame 25, which frame 25 is mounted on the posts 28 secured in any suitable way to the frame of the knitting machine. The element 24' is slidably connected to standard 24 by bolt and slot for vertical adjustment.

A slide bar 26 is suitably housed on the frame 25 and is provided with an abutment 27 adapted to engage the lower end of lever 20. The slide bar 26 is provided with a lug 29 to which is connected one end of the link 30, see Fig. 2. The other end of link 30 is adjustably connected, by pin and slot engagement, to the bell-lever 31, pivotally mounted at 32 on the frame 25. The other arm of bell-lever 31 is pivotally connected, by means of the link 33, to the slide bar 34; also suitably housed on the frame 25. This slide bar 34 is provided at its free or outer end, with an extension 35 pivoted thereto. Extension 35 is provided with a lug 36 to which is pivoted one end of the link 37. A bar 38 is slidably connected to slide bar 34 by means of pin and slot engagement. The outer end of the slide-bar 38 is provided with a lug 39 to which the other end of link 37 is pivotally secured. The rear end of the slide-bar 38 is provided with a lug or projection 40, extending at right angles to the main extension of said bar 38.

It should also be noted that the housing of slide-bar 26 includes an engaging surface 41 of leather or similar material subject to adjustable pressure by means of the pressure screw 42 as shown in Fig. 3.

A rotatable head 43, see Fig. 15, is mounted on a shaft 44 vertically mounted in a suitable bearing in the frame 25. This head 43 is pinned or keyed to the shaft 44 by the pin 43'. To the underside of head 43 is rigidly secured the cam plate 45.

Loosely mounted on the shaft 44 is the worm gear wheel 46, the upper side of which is provided with a recess 47 into which the cam plate 45 projects, see Figs. 14 and 15. The cam plate 45 is so formed peripherally as to provide tapered recesses 48 between its margins and the surrounding margin of the recess 47. The rollers 49 are seated in these tapered recesses 48 and are urged towards the tapering ends of said recesses 48 by the springs 50.

By this arrangement it will be seen that the shaft 44 and cam plate 45 will be capable of independent counter-clockwise movement with respect to the gear wheel 46, but will be locked therewith with respect to reverse movement.

Certain specific features of the means for securing the required relationship between the head 43 and shaft 44, were invented by Aaron Loewy and are claimed by him in a copending application filed July 24, 1924, Serial No. 727,858. This application has resulted in Patent #1,628,989 dated May 17, 1927. These details are not specifically claimed by me but are shown, merely as forming the best embodiment of the completed machine.

A plate 51 is secured on top of head 43 by any suitable means, such as by the screws 52. The top outer margin of the plate 51 is provided with the annular recess 53 and the underside is provided with the annular channel 54.

A number of stop elements or blocks 55, see Fig. 9, each having arc-shaped ribs 56 and 57 on its upper side and the bevelled projection 58 on its underside, are secured between the plate 51 and the head 43. The arc-shaped rib 57 seating in the annular channel 54 while the arc-shaped rib 56 is engaged with the clamping plate 59 which cooperates with the screw 60 in holding said block in any desired position around the periphery of the head 43 and plate 51. A number of these blocks are provided as shown in Fig. 2. These blocks 55 have an outer contact face 55'. This face 55' has a sharply defined edge where it joins the left hand longitudinal margin of the block, and forms the critical point or margin of release of the detent 79.

Certain features of this block, forming the detent engaging or contact face, were invented by Aaron Loewy and are claimed by him in his said copending application.

In other words the broad features of invention embodied in the construction herein described and illustrated are my invention solely, while certain specific details in connection with the clutch associated with the head, and the specific means for adjustably mounting the blocks for engaging the detent were made by the said Loewy in accordance with my instructions, and were combined with the broad features invented by me.

In addition to the blocks 55, a stop arm 61, see Fig. 2, is secured to the top of plate 51 by any suitable means, as for example, by the screws 62.

A shaft 63, see Fig. 2, has suitable bearings connected to the frame 25 and carries at its outer end a ratchet wheel 64. This shaft is also provided with a worm 65 which cooperates with the worm gear wheel 46.

The arm 65, see Fig. 1, is pivotally mounted on the shaft 63, and carries a pawl 66 which cooperates with the ratchet wheel 64. Arm 65 is connected by link 67 to an arm of bell-lever 68. This latter connection is by slot and pin engagement for purposes of adjustment. Lever 68 is pivoted at 69 to the framework 25 and has an arm provided with the anti-friction wheel 70 for engagement with the cam 71. This cam 71 is mounted on the shaft 72, see Fig. 7, driven synchronously with the knitting machine. The spring 73, connected between the lever 65 and the frame 25, keeps the wheel 70 in contact with the cam 71, and the rotation of the cam 71 causes a forward and back movement of the pawl 66, and consequently a step by step movement of the ratchet wheel 64, with each revolution of cam 71.

A lever 74 is pivotally mounted at 74' to a bracket 75, connected to one of the posts 28, and is adapted to be engaged and actuated against the tension of spring 76, by a stud 77 on the side of the cam wheel 71. The upper end of this lever 74 is provided with a contact plate 78, for engaging the end of the extension 35 of slide bar 34.

Two ratchet wheels 64 are shown. These wheels may be of the same diameter, but one is provided with more teeth than the other. This arrangement is provided to adapt the machine to climatic condition, but is not a part of the present invention.

*Latching mechanism.*

Figure 4:
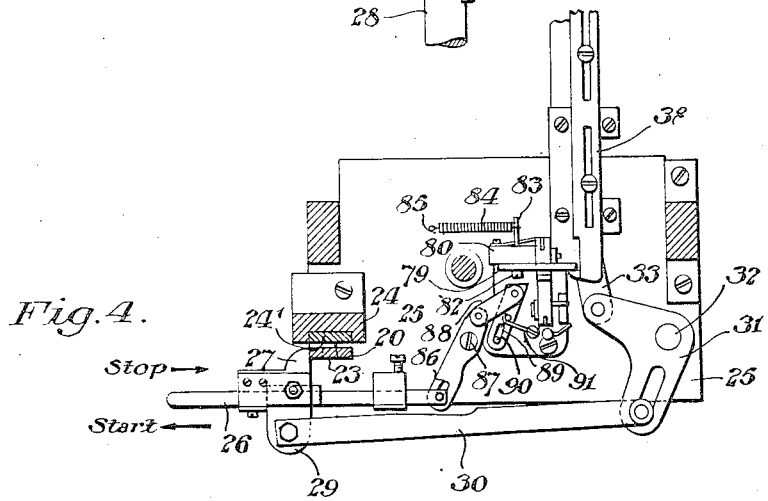
Fig. 4 is a plan view below the line 4, 4 on Fig. 3.

A detent member or plate 79 is slidably mounted by pin and slot connection on a stationary block 80, see Figs. 4 and 12. This detent plate 79 has an upwardly extending portion 81 for engaging with the margins 55' of the blocks 55. This detent plate 79 also has a stud 82 projecting from one side near its lower inner end, and on its other side it is provided with a pin 83 connected to one end of spring 84, the other end of said spring being connected to the stationary point 85.

To one end of slide-bar 26 is connected, by pin and slot engagement, the lever 86, see Fig. 4, which is pivotally mounted on stud 87 secured to the frame 25. The other end of lever 86 is pivotally connected to one end of link 88; the other end of link 88 being pivotally connected to lever 89 which is connected to the stationary framework by a slot and stud connection, as at 90. A spring 91 operates normally to maintain lever 89 with the stud at the outer end of the slot, that is, with the inner end of said lever 89 at its nearest point of approach to the detent plate 79.

A member 92, see Figs. 12 and 13, is pivotally connected to an upright arm or lever 93; the lower end of which is pivotally connected to the block 80, and operates in a channel formed in said block, and is normally controlled by the spring 94, secured to said block.

The pawl 95 is pivotally secured to the upright 96, connected to or projecting from the frame 25. This pawl 95 is normally controlled by the spring 97. The outer end of the pawl 95 is rounded for engaging with the rounded end of member 92, and for moving said member 92 against the actuation of its spring 94. This pawl 95 is provided with a laterally extending pin 98, projecting into a recessed part 99, of the upright or post 96, for limiting the movement of the pawl. This pawl 95 is also provided with an upwardly extending nose 100 for engagement with the rounded lugs 58 projecting from the undersides of the blocks 55.

The lever 101 is pivotally mounted on the post 102, and is normally controlled by the spring 103. This lever 101 is provided with a downwardly projecting element or extension 101' adapted normally to engage the outer edge of detent member 79.

*In operation.*

The object of the device being automatically to stop the knitting machine, upon the completion of the required number of courses of given characteristic, the blocks 55 are arranged around the head, so that the left hand margin of each arc-shaped surface 55' of a block 55, adapted to engage the detent plate 79, shall be separated from an adjacent left hand margin, the precise distance which represents the number of courses required for a certain part of the knitted fabric. That is to say, if for example, it is required that two hundred courses shall be knitted of a required width, and each course is represented by one tooth of the ratchet wheel 64, and the wheel contains forty teeth, it follows that the ratchet wheel must make five rotations to secure the required number of courses. This distance is measured as the head 43 rotates, due to the actuation by the ratchet wheel through the worm gear, and the blocks 55 are set accordingly. The other blocks are all similarly adjusted with respect to the spaces between the said left hand corners of adjacent blocks to secure the required number of courses in each section of the knitting thus represented. It should also be noted that, in the initial position of the head, the arm 61 engages with the lever 101, as in Fig. 2. It follows that the engaging edge of this arm 61 is properly spaced from the left hand edge of the arc-shaped face of block 55, next adjacent to said arm 61, to secure the required number of courses for the first section to be knitted.

In Fig. 16, I have shown diagrammatically the respective distances between the points of release; that is, the left hand corner of the peripheral faces of element 61 and of each element 55 are indicated by the letters $a$, $b$, $c$, $d$ and $e$. Each of these distances represent the extent of each movement of the head 43, between each point of arrest, and the corresponding operation of the knitting machines, to secure the required number of courses in each section of the work which is being controlled. As above stated, these cam blocks 55 are all adjustable with respect to each other and with respect to the arm 61. Such adjustment having been made, the machine is started by operating, for example the controlling rod 19. This causes a corresponding movement of lever 20.

By the arrangement shown in Figs. 3 and 4, this starting operation causes the movement of the lower end of lever 20 to the left, and a corresponding movement to the left of slide-bar 26. This movement results primarily in the actuation, through the levers 86 and 89, acting upon the lug 82, of the detent plate 79, and causes it to shift to the right against the action of spring 84; in which position it is latched by the member 92, as shown in Figs. 12 and 13 (first position). This results in detent 79 engaging the extension 101' of lever 101, to disengage said lever 101 from the arm 61, on the plate 51, connected to head 43. At the same time detent plate 79 engages the lug 40 on slide-bar 38 to lock the same in the position in which extension 35 is held in the elevated position out of engagement with lever 74, as indicated in Fig. 1ᵇ. The slide-bar 38 has been previously moved into said position upon the inward cam actuated movement of slide-bar 34.

The knitting machine is now in operation, and the cam 71, rotating synchronously therewith, causes a step by step rotative movement of ratchet wheel 64, which causes, through the worm gear, a rotative movement of head 43. As the first set of courses nears completion, the lug 58 of the first block 55 encounters the projection or nose 100 on the pawl 95 and presses it down so that its rounded end engages the end of member 92 and forces it back against the action of spring 94, so as to release the edge 79' of detent 79 to permit it to pass said member 92, and move, in response to the actuation of spring 84, so that the inner edge of extension 81 of detent 79 will engage the face 55' of block 55, as in Figs. 12 and 13, (second position). As the lug 58 passes the projection 100, the end of the pawl 95 is elevated by the action of spring 97, so as to permit the edge 79' of plate 79 to pass beneath said pawl 95. Meanwhile the edge of extension 81 continues to engage the contact face 55', until the left hand edge, or the critical margin of release of said face is reached, whereupon the detent plate 79 moves into final position (Figs. 12 and 13, third position), in response to actuation of spring 84. This is the point at which the required number of courses has been completed, and the knitting machine is to be stopped in order to adjust the same for a different set of courses.

This final movement of detent plate 79 releases the end 40 of slide bar 38 and permits the extension 35 of slide-bar 34 to fall into the path of travel of contact piece 78 on the end of lever 74, which is actuated with each rotation of cam 71 by the engagement with said lever 74, of the lug 77 on cam 71, with the result that the slide-bar 34 is actuated, to operate through link 33, bell-lever 31 and link 30, the slide-bar 26, to the right and thus move the controlling lever 20 to stop the knitting machine.

When the slide bar 26 moves to the left, in starting the machine, the lever 89 engages the lug 82 to shift the detent plate 79 to the right, as above described. This lever 89 however, because of its spring controlled pin and slot connection, after actuating the detent plate, snaps clear of lug 82, so that the detent plate is free to move to the left to initial position, without interference of said lever 89 with lug 82.

When slide-bar 26 is moved to the right, to stop the machine, the lever 89 is permitted, because of said spring controlled pin and slot engagement, to snap over the lug 82 of detent 79 into position on the left hand side thereof, so as to be in position to actuate said detent plate to the right upon again starting the machine, as above described.

When the machine has been set for the next set of courses the machine is again started by the arbitrary actuation of controlling rod 19 and the operation is repeated as above described.

Figure 5:
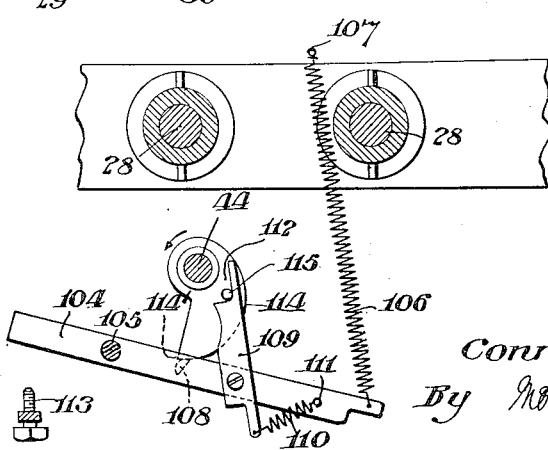
Fig. 5 is a plan view below the line 5, 5 of Fig. 3.

When the last set of courses has been completed, the head 43 is caused automatically to rotate to initial position as shown in Fig. 2. This is accomplished by the following mechanism. At the lower end of shaft 44 is secured the cam 114, see Fig. 5, having a crank pin 115 on the upper side thereof. To a post 105, extending downwardly from the frame 25, is pivotally mounted the lever 104, having a lug 108 on the underside thereof, adapted to engage the periphery of cam 114. This lever 104 is provided with the spring 106, and has pivoted to its upper side the spring controlled lever 109, having the end 112 engaging the crank pin 115. The cam rotates in the direction of the arrow, and its point 114' is set to pass the pin 108, after the critical margin of release of the last block 55 has released the detent slide 79, that is, after the last set of courses has been completed. In the initial position, or starting position of the knitting machine, the concentric part of the cam surface engages pin 108. As the shaft rotates the cam surface which engages 108 gradually increases in distance from the cam axis and thus pushes lever 104 away from shaft 44 and stretches the spring 106, thus building up power therein. As the cam thus rotates, it will be noted that the spring controlled lever 109 has its end 112 in engagement with crank pin 115. When pin 108 passes over point 114', the lever 104 is snapped back to initial position and, through the actuation of spring 106, the lever 109, acting upon the crank pin 115, communicates to the shaft 44 a quick rotative actuation to complete its rotation and bring the arm 61 into engagement with lever 101, as in Fig. 2, and thus the device is quickly brought to initial position.

Referring to Figs. 14 and 15, it will be seen that this final movement is possible by the cam and roller relationship between shaft 44 and gear wheel 46. When the worm wheel 46 is rotated by its worm, in the counterclockwise direction, the roller engagement in the tapered recesses 48 requires that the shaft 44 must rotate with it. That is, the shaft and gear wheel are locked positively together, and the shaft 44 is driven by worm wheel 46.

When however the shaft is actuated by the spring 106, acting through the levers 104 and 109 on the crank pin 115, the shaft 44 is free to move in advance of the gear wheel.

On the other hand when the gear wheel is stopped there is no possibility of a rebound or back movement of the shaft. This is of great importance, because, the extremely short distance between the adjacent left hand edges of the bearing faces of the blocks 55, measures several hundred courses, and a variation by a very small fraction of an inch, in the stopping point of the head, would result in a discrepancy of many courses in the knitting, and thus imperfect product would result. This irregularity is quite common in the present practice where the "rule of thumb" is used.

By the present device the gear wheel and shaft move as an integral body, when the shaft is actuated by the gear wheel; there is no backward movement, or back lash, of the shaft 44. At the same time, the shaft is free to move in advance of the gear wheel, when the final set of courses is completed, to bring the device back instantly to initial position.

As above stated, the specific means described and illustrated in the drawings, for effecting the invention, is merely by way of example. This is considered the preferred embodiment for actuating the type of electric switch in use with full fashion knitting machines at the time of filing this application. The essential features of the present invention being the means providing critical margins of detent release, moved synchronously with the machine, and the cooperating detent adapted to be released by a critical margin of release whereby the switch actuating mechanism is rendered effective at the required point in the knitting operation, in combination with automatic means for moving the controlling mechanism to initial position upon the completion of the last set of courses.

What I claim is:—

1. An automatic control for knitting machines, comprising means for stopping the machine, and means for controlling the stopping means including a detent and a cooperating rotating element moving synchronously with the machine provided with critical margins of detent release, said detent operating upon release by a critical margin of release to render the stopping means effective upon completion of a predetermined course, and means operating automatically to complete the movement of the rotating element to initial position upon the completion of the last of a predetermined set of courses.

2. An automatic control for knitting machines, comprising means for stopping the machine, and means for controlling the stopping means including a detent and a cooperating rotating element moving synchronously with the machine provided with critical margins of detent release in predetermined spaced relationship, said detent operating upon release by a critical margin of release to render the stopping means effective upon completion of a predetermined course, and means operating automatically to carry the rotating element to initial position upon release of the detent by the last of said margins of release.

3. An automatic control for knitting machines, comprising means for stopping the machine, and means for controlling the stopping means including a detent and a cooperating rotating element moving synchronously with the machine, but at greatly reduced speed, provided with critical margins of detent release, said detent operating upon release by a critical margin of release to render the stopping means effective upon completion of a predetermined course, and means automatically to carry the rotating element to initial position after the last of the set of courses has been completed.

4. In an automatic control for knitting machines, the combination of an electric motor for driving the machine, an electric switch for controlling the motor, means for operating the switch, a detent and a cooperating rotating element moving synchronously with the machine provided with critical margins of detent release, said detent operating upon release by a critical margin of release to render the switch operating means effective to stop the motor upon completion of a predetermined course, and means including a cam formation and a spring for building up power during the knitting operation, operating automatically to carry the rotating element to initial position upon completion of the last set of courses.

5. In an automatic control for knitting machines, the combination of an electric motor for driving the machine, an electric switch for controlling the motor, means for operating the switch, a detent and a cooperating rotating element, combined pawl and ratchet and reduction gear mechanism operating with the machine and communicating movement to the rotating element, said rotating element provided with critical margins of detent release, said detent operating upon release by a critical margin of release to render the switch operating means effective to stop the motor upon completion of a predetermined course, and means including a cam formation and a spring for building up power during the knitting operation, operating automatically to carry the rotating element to initial position upon completion of the last set of courses.

CONRAD SCHUETZ.